No. 865,549. PATENTED SEPT. 10, 1907.
N. WARING.
POTATO PLANTER.
APPLICATION FILED SEPT. 17, 1903.
3 SHEETS—SHEET 1.
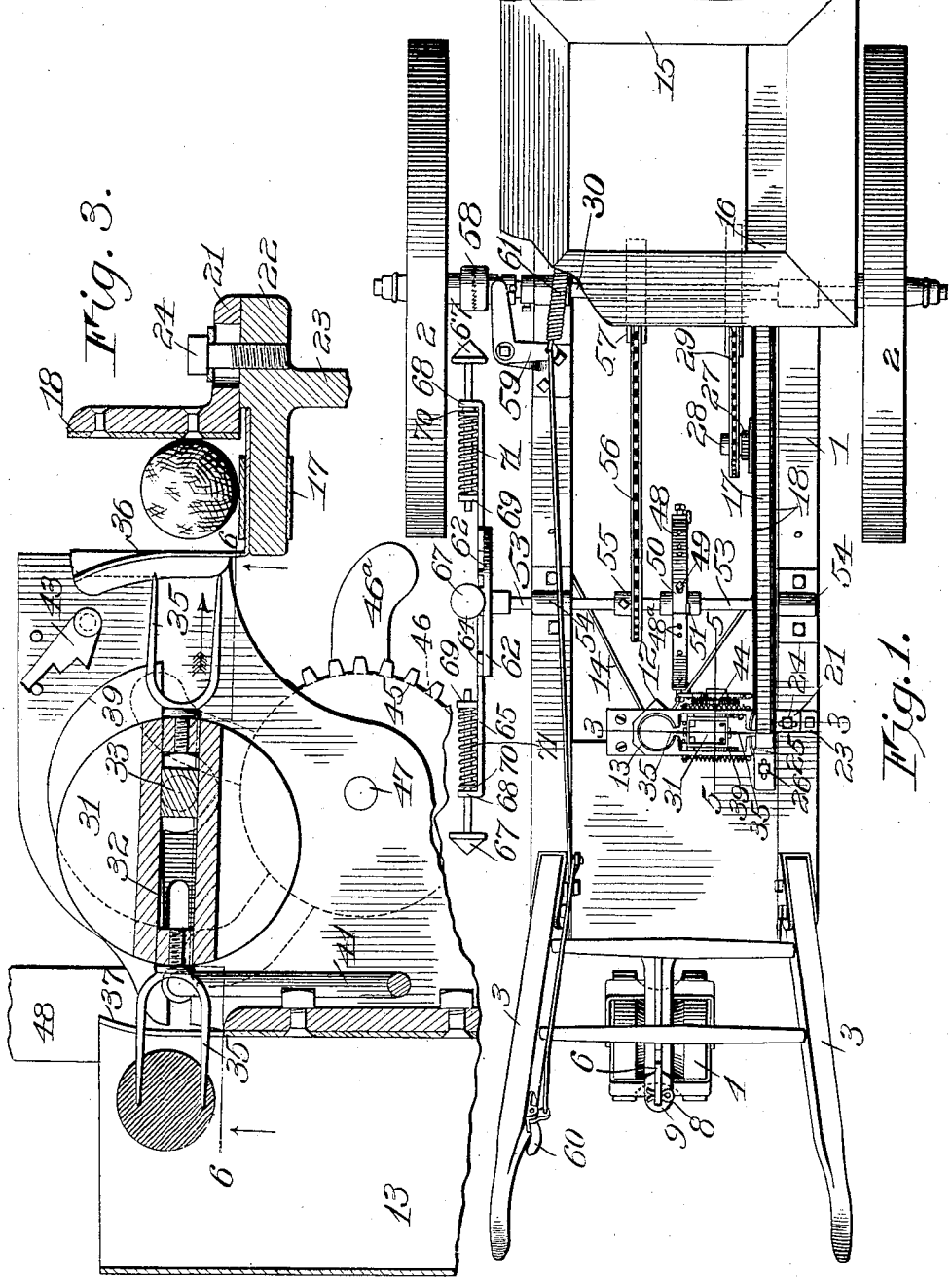
Witnesses. Inventor.

No. 865,549.
PATENTED SEPT. 10, 1907.
N. WARING.
POTATO PLANTER.
APPLICATION FILED SEPT. 17, 1903.
3 SHEETS—SHEET 2.
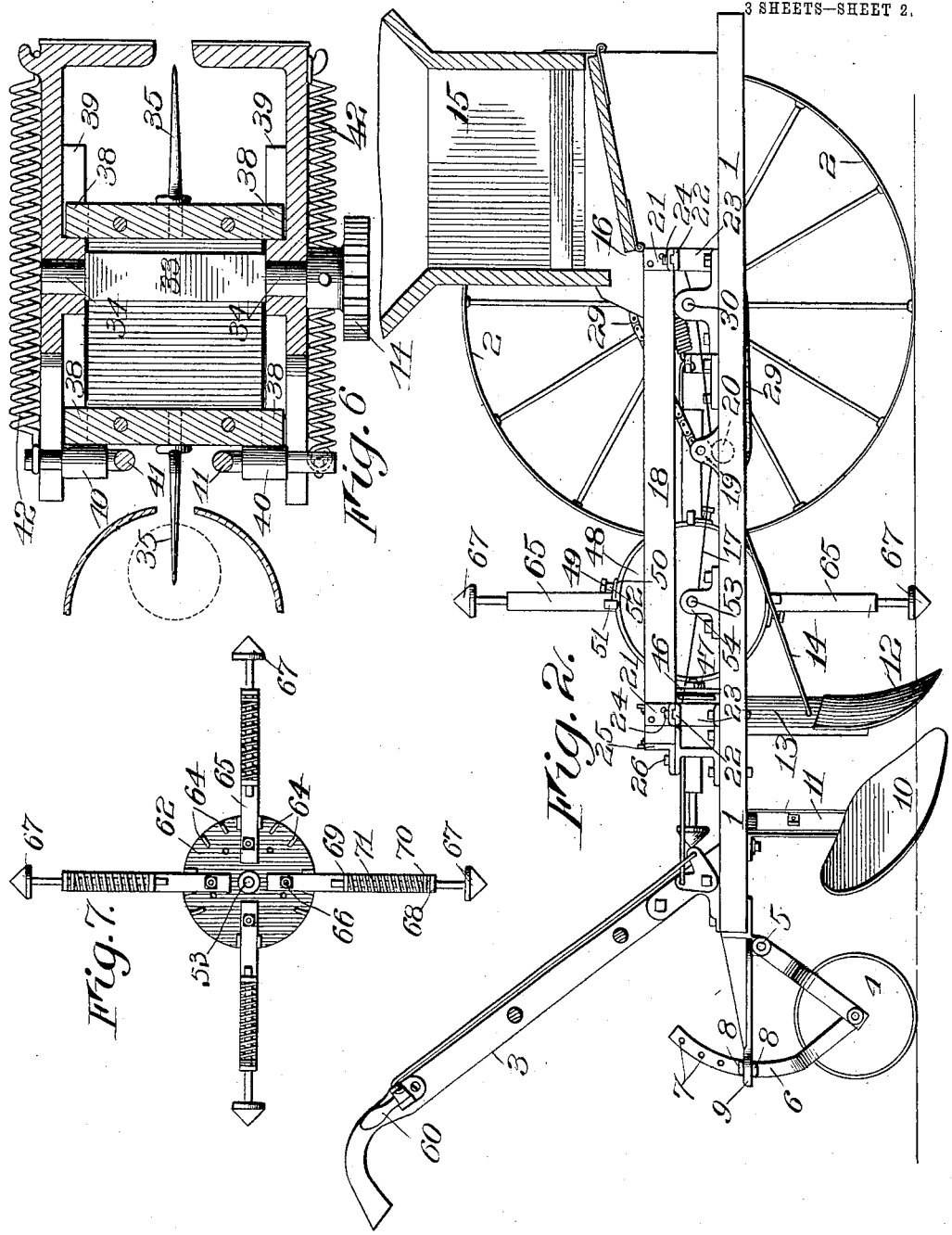
Witnesses.
Walter B. Payne.
G. Willard Rich.
Inventor.
Nicholas Waring
by Frederick T. Church
his Attorney.

No. 865,549.
PATENTED SEPT. 10, 1907.
N. WARING.
POTATO PLANTER.
APPLICATION FILED SEPT. 17, 1903.
3 SHEETS—SHEET 3.
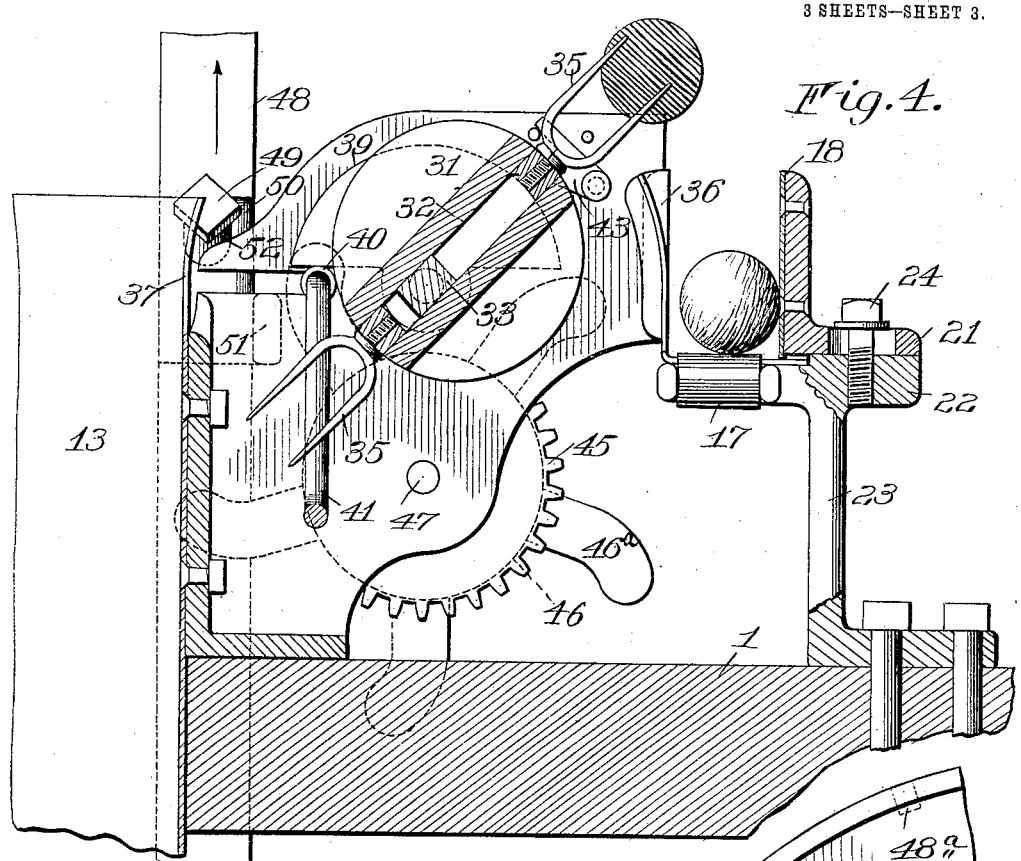
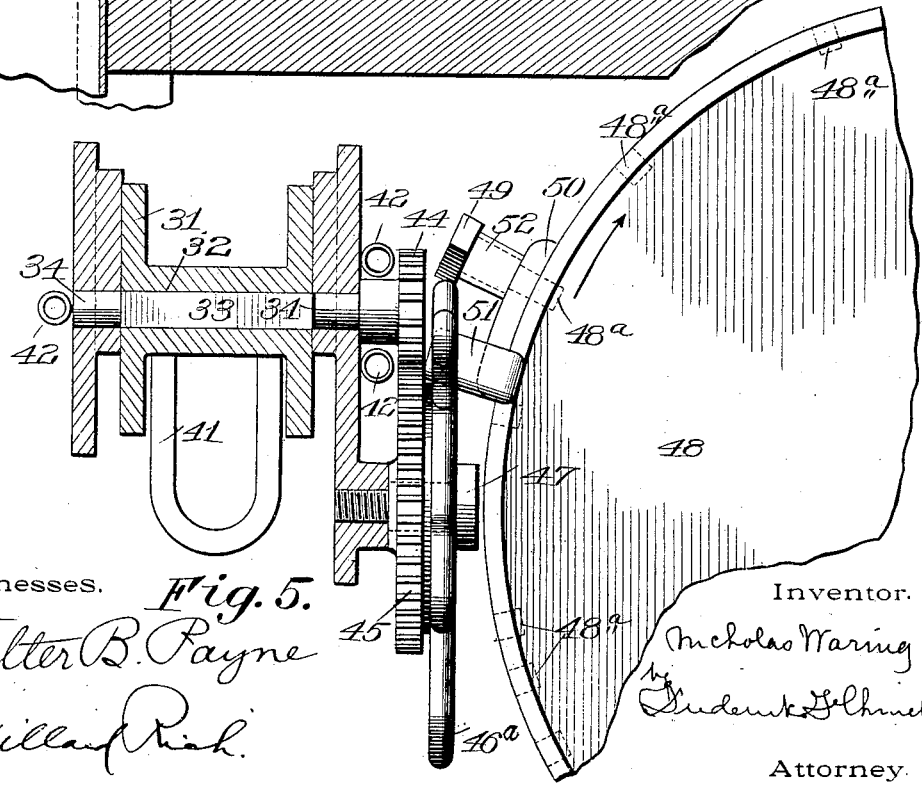
Witnesses.
Walter B. Payne
G. Willard Rich.
Inventor.
Nicholas Waring
by Frederick F. Church
Attorney.

UNITED STATES PATENT OFFICE.

NICHOLAS WARING, OF ROCHESTER, NEW YORK.

POTATO-PLANTER.

No. 865,549.  Specification of Letters Patent.  Patented Sept. 10, 1907.

Application filed September 17, 1903. Serial No. 173,601.

*To all whom it may concern:*

Be it known that I, NICHOLAS WARING, of Rochester, in the county of Monroe and State of New York, have invented certain new and useful Improvements in Potato-Planters; and I do hereby declare the following to be a full, clear, and exact description of the same, reference being had to the accompanying drawings, forming a part of this specification, and to the reference-numerals marked thereon.

My present invention relates to improvements in planters and analogous devices, and more especially to that class particularly applicable to the planting of potatoes and the like; and it has for its object the production of a device of this character employing novel mechanism for distributing the articles to be planted at predetermined intervals, and also a checking device for marking the rows thus planted, said distributing and checking devices being adjustable for planting in rows of varying widths.

Other features of novelty and advantage will be hereinafter more fully explained and pointed out in the claims hereunto annexed.

In the drawings: Figure 1, is a plan view of a planter embodying my invention, Fig. 2, is a side elevation of the same, parts being in section, Fig. 3, represents a section on the line 3—3 Fig. 1, showing the delivering device on an enlarged scale. Fig. 4, is a similar view with the positions of the parts altered. Fig. 5, is a sectional view taken on the line 5—5 Fig. 1, showing the operating mechanism for said deliverer on an enlarged scale. Fig. 6, represents a section on the line 6—6 of Fig. 3 looking in the direction of the arrows, and Fig. 7, is a detail view of the checking device.

The same numerals of reference designate similar parts throughout the several views.

In the present embodiment of my invention, 1 designates the main frame, supported on the wheels 2—2, and provided with handles 3 by means of which the operator may manipulate the machine. At the rear and beneath the frame of the machine is located a trailing wheel or coverer 4 pivotally secured at 5, and provided with a grooved periphery, the purpose of which will hereinafter appear, a yoke 6 being connected to this wheel, and provided with adjustment apertures 7—7 through which may be passed the pins 8, bearing on the extension 9 of the frame, to retain said wheel at any desired adjustment. In advance of this trailing wheel 4 are provided a pair of oppositely-disposed mold boards or coverers, 10—10 supported by the standards 11—11 connected to the main frame and immediately in front of these coverers is located the plow point or furrow opener 12 carried by the chute 13 and braced by the rods 14—14.

Mounted in any suitable manner on the frame is a receptacle or hopper 15 having an inclined bottom provided with a discharge aperture 16, and in immediate proximity to this discharge aperture is an endless belt or carrier 17, operating between guards 18—18 and driven by the rollers 19—20. One of these guards is preferably adjustable for varying the distance between them, and for this purpose the laterally extending grooved lugs 21—21 are provided, adapted to fit corresponding lugs 22—22 of the support 23, and to be secured in its adjusted position by a set screw 24. An endless belt or carrier 17 is also supported by the support 23 and at one extremity thereof is provided a stop 25 preferably adjustable and provided with an adjusting screw 26. This belt or carrier 17 passes between the rollers 19, 20 which are connected together by the gears 27 and driven by the sprocket wheel 28, connected by the chain 29 to the driving shaft or axle 30, these parts being so arranged that forward motion of the machine will impart motion to said carrier in a direction from said hopper toward said stop 25.

In proximity to the stop 25 and at one side of the carrier is located a distributer for discharging the vegetables to be planted at predetermined intervals, and in the present embodiment such a device is shown comprising a rotary support 31, slotted diametrically as at 32 within which rests the rectangular or similarly shaped portion 33 of the operating shaft 34, the construction being such that motion will be transmitted from the shaft to the carrier irrespective of the relative positions thereof.

Extending radially from the opposite ends of this carrier 31 are forks 35—35, each adapted to operate alternately through the slotted plate 36 and the slot 37 in the chute, in a manner to be hereinafter described. Located in proximity to each fork and extending laterally from the carrier are projections 38—38, so disposed as to ride on the surfaces of the cams 39—39 arranged concentrically with the shaft 34 and on the periphery of the rotary carrier bear the rollers 40—40, journaled on the frame 41. This frame 41 may be looped as shown to clear the forks 35, and is under tension of the springs 42—42, the normal tendency of which is to move said carrier, and consequently said forks, in the direction indicated by the arrow Fig. 3. In the path of the projections 38 may be provided a pawl 43 or a similar device to prevent retrograde motion of said carrier. This carrier is rotated by the operating shaft 34 irrespective of the relative positions thereof, and this shaft is provided with a gear wheel 44 meshing with the gear wheel 45 connected to the star wheel 46, both mounted on the stud shaft 47, the relation between the gears 44 and 45 being preferably such that rotation of the wheel 46 a distance equivalent to the span from one tooth to an adjacent tooth will cause a half revolution to the carrier 31.

In proximity to the wheel 46 is an actuator disk 48 and on the periphery thereof are provided a plurality of apertures 48ª adapted to receive the stud 49 and for each stud is provided a plate 50 carrying an operating projection 51, an antifriction roller 52 being preferably fitted over the stud 49 to engage the teeth 46ª of the wheel 46. The apertures 48ª in the periphery of the disk 48 may be so arranged that the studs 49 and connected parts may be located at any predetermined intervals, and in the present embodiment said studs may be adjusted to occur at such intervals as to divide the periphery of the disks into from four to eight parts, although any other divisions may be adopted to meet the requirements of various conditions.

As the disk rotates in the direction indicated by the arrow, each stud 49 will successively engage a tooth 46ª of the wheel 46 causing a partial rotation thereof, and continued rotation of the disk will bring the projection 51 into engagement with said tooth to complete the movement and cause said wheel 46 to rotate from one tooth to the next succeeding, and as the gear 45 meshing with the gear 44 is connected to and rotates with the wheel 46, actuation of the latter in the manner hereinbefore described will cause a half revolution of the carrier 31.

The disk 48 may be operated in any suitable manner, such as by the shaft 53 journaled on the frame at 54, and provided with a driving or sprocket wheel 55 connected by the chain 56 to the wheel 57 on the driving shaft 30. The wheels 2—2 are loosely mounted on this driving shaft, a clutch 58 being interposed between one of said wheels and shaft for operating the latter, suitable connections being provided between the bell crank 59 and the handle 60, for operating said clutch from a distance, a spring 61 being provided for normally retaining the clutch members in engagement.

A device for checking the rows may also be employed in connection with the planter and in the present embodiment of my invention such a device is illustrated (see Fig. 7), comprising a disk 62 mounted on the shaft 53 provided with a plurality of lugs 64 forming sockets for the reception of the radially disposed arms 65. Said sockets are arranged in sets, the number of which may be varied as desired, two sets being shown whereby either four or five arms may be carried by said disk. These arms are secured in position between each pair of lugs 64, in any suitable manner, as by bolts 66 and are provided with markers 67 at their extremities. To secure proper action of these markers in operating over inequalities in the surface of the ground and also to exert a resilient force thereon, they are each slidingly mounted in projections 68—69, a stop 70 being provided on the marker between which and the projection 69 a helical spring 71 is interposed, the normal tendency of which is to press said markers outwardly. The number of markers will be determined by the number of actuators on the disk 48, said markers being so arranged as to produce a mark directly opposite each article deposited by the deliverer, and for the purpose of accurately timing the operation of the deliverer and the checking device either or both of the disks 48 or 62 may be adjusted on the shaft 53.

A clear understanding of the operation of the machine may be had from the following: Assuming that the receptacle or hopper 15 is supplied with potatoes or other articles to be distributed, and that motion is imparted in any suitable manner to cause the machine to travel forwardly, it will be understood that with the parts in the positions shown in Fig. 1, motion will be transmitted from the wheels 2—2 to the driving shaft 30, which in turn transmits its motion through the chain 29 and wheel 28 to the belt or carrier-operating rollers 19, 20, causing said carrier to move from said hopper toward said deliverer. Motion will also be imparted through the chain 56 and wheel 55 to the shaft 53, to cause the disk 48 to rotate in the direction indicated by the arrow, Fig. 5. Supposing for convenience, that potatoes are being planted, it will be seen that they are continuously discharged through the aperture 16 of the hopper to be arranged in a row on the carrier 17 as it travels along, bringing the potatoes in successive order into the position indicated in Fig. 3, that is, directly in line with the adjacent fork 35 of the deliverer. In the meantime, rotation of the disk 48 will bring the actuating devices 49—51 thereon successively into engagement with the teeth or projections 46ª of the star wheel 46, actuating said wheel to cause a half revolution of the carrier 31. In Fig. 3 the position of the carrier is shown during a half revolution, and continued revolution of the carrier will cause the projections 38 to ride off the cams 39—39, when the carrier, under the action of the springs 42—42, will thrust the fork forwardly to impale the potato thereon. At the same time the fork directly opposite and resting in the slot 37 of the chute 13 will be retracted, releasing the potato impaled thereon and dropping it into the chute. The carrier 31 will continue to rotate until it assumes the position shown in Fig. 4, where it is held by the latch 43 until it is revolved by a succeeding pin or stud 49 engaging one of the arms or teeth 46ª. By employing the latch 43 and making the motion of the disk intermittent, an operator is permitted to apply an article to the fork 35 by hand, if the latter should rise without having impaled one. This operation will be repeated at successively recurring intervals, each time the star wheel is rotated by the actuators 49 on the disk 48.

As the discharge end of the chute is behind the plow point 12, it will be obvious that the potato will be deposited in the furrow opened by the plow point, and as the coverers 10—10 follow immediately behind, said furrow will be filled and the potato thereby covered. The trailing wheel 4 may be provided to follow the coverer and roll down the soil, the groove in the periphery thereof preventing excessive packing of the soil directly over the potato.

The checking device will operate continuously with the deliverer, the markers thereon being so timed as to form a mark or other indication opposite each potato planted, or if preferred, the operation thereof may be discontinued during the operation of the deliverer.

Of course in the present embodiment certain details and arrangements of the parts are shown, but it will be understood that I do not limit myself to such construction, as many modifications and changes may be made therein without departing from the spirit of my said invention.

I claim as my invention:

1. In a planter the combination with a receptacle; of a rotatable distributer to which the articles to be planted are fed, and an actuator for operating said distributer intermittently to deposit said articles at predetermined intervals.

2. In a planter the combination with a receptacle, and a carrier receiving the articles from said receptacle; of a rotatable distributer having a reciprocatory member thereon for receiving the articles from said carrier and depositing them, and an actuator for operating said distributer intermittently at predetermined intervals.

3. In a planter, the combination with a seed receptacle, and feed devices for advancing the articles therefrom with a continuous movement, of a distributer embodying an intermittently operating carrier, and devices on the carrier and operating during the movement of the carrier for receiving the articles from the feed devices.

4. The combination with a receptacle for the articles to be distributed, of a distributer, an actuator having adjustable devices for periodically operating said distributer to simultaneously receive and discharge said articles, at predetermined intervals, and a checking device mounted to operate with the actuator for marking the position of said articles discharged.

5. The combination with a receptacle for the articles to be distributed, of a distributer for depositing said articles, operating devices for said distributer, and an adjustable actuator coöperating with said devices to cause said distributer to deposit said articles at various intervals.

6. In a planter, the combination with a hopper for the articles to be planted, of a distributer embodying a revoluble carrier, a reciprocatory member movable with the carrier having a pair of oppositely-extending article-receiving devices thereon, means for rotating the carrier, and devices for reciprocating said member during the rotation of the carrier to simultaneously receive one article and discharge another.

7. In a planter, the combination with a hopper for containing the articles to be planted, of a distributer having a reciprocatory member capable of simultaneously receiving one article and discharging another, and operating means therefor.

8. In a planter, the combination with a hopper or receptacle for containing the articles to be planted, of a revoluble distributer, a relatively movable member carried thereby capable of simultaneously receiving one article and discharging another at each operation, and means for operating the distributer.

9. In a planter, the combination with a hopper for containing the articles to be planted, of a distributer embodying a revoluble carrier, a reciprocatory member mounted in the carrier and having oppositely arranged devices for receiving the articles thereon, and means for operating the distributer whereby the reciprocatory member will receive an article upon one of the devices and discharge one from another when the member is moved in one direction.

10. A distributer of the character described, comprising a movable carrier, a relatively movable member carried thereby having oppositely disposed impaling devices thereon, operating devices connected to said carrier, and means for impaling an article to be distributed periodically during the operation of said carrier.

11. A distributer of the character described, comprising a rotatable carrier, impaling devices operating during the rotation of the carrier thereon for receiving the articles to be distributed, operating devices connected to said carrier, a relatively fixed ejector for releasing an article from said impaling devices periodically during the operation of said carrier, and actuators coöperating with said operating devices to operate said carrier intermittently at predetermined intervals.

12. A distributer of the character described comprising the relatively fixed feeding device and ejector, a carrier operating between the feeding device and ejector, and impaling devices on said carrier connected for simultaneous operation for simultaneously impaling one article and ejecting another to be deposited.

13. A distributer of the character described comprising a carrier and impaling devices thereon, means for operating said carrier, a movable conveyer for continuously feeding the articles to be distributed to said carrier, and devices for causing said articles to be impaled and ejected periodically during the operation of said carrier.

14. In a planter, the combination with a revoluble carrier, and a relatively movable member mounted thereon and provided with devices for receiving the articles to be planted, of a receptacle located at one side of the carrier for feeding the articles thereto, a relatively fixed ejector at the opposite side of the carrier, and means for operating the carrier and member, to receive an article at the receptacle and discharge it at the ejector.

15. In a planter, the combination with a revoluble carrier, and a relatively movable member mounted thereon and provided with oppositely disposed devices capable of receiving the articles to be planted, of a receptacle located at one side of the carrier, a relatively fixed ejector at the opposite side of the carrier, and means for operating the said member to discharge an article at the ejector and by the same movement receive an article from the receptacle.

16. The combination with a feeding device, a distributer having devices adapted to receive articles from the feeding device and discharge them, and a star-wheel operatively connected to the distributer, of an actuator for the distributer embodying a rotatable member having projections thereon arranged to coöperate with the star-wheel to operate the latter.

17. A potato planter including a distributer, feeding devices therefor, impaling devices carried by said distributer, an ejector and a delivery chute in proximity thereto, devices for operating said distributer intermittently, means for simultaneously impaling and ejecting an article from said impaling devices periodically during the operation of said distributer, and actuators adjustable within certain limits for actuating said operating devices at predetermined intervals.

18. A distributer comprising a rotatable carrier capable of a relatively lateral motion and impaling devices thereon, an ejector and feed devices in proximity to said impaling devices, means normally tending to move said carrier laterally toward said feed devices and away from said ejector and retaining devices adapted to release said carrier periodically during its rotation to simultaneously eject and impale the articles to be distributed.

19. A distributer comprising a carrier capable of a relatively lateral motion and impaling devices thereon, an ejector and feed devices in proximity to said impaling devices, means normally tending to move said carrier toward said feed devices and from said ejector, devices for releasing said carrier when said impaling devices are in proximity to said ejector and feed devices to simultaneously eject and impale an article to be distributed, a rotating member carrying actuators disposed at predetermined intervals thereon, and operating mechanism to be engaged by said actuators to operate said carrier.

20. In a planter, the combination with the distributer capable of discharging the articles to be planted at intervals, and a revoluble actuating member having adjustable devices for operating the distributer at different intervals, of a checking device adjustable correspondingly and mounted to rotate with the actuating member for marking the positions of the articles deposited.

21. In a planter, the combination with the distributer, feed and discharge devices for depositing the articles to be distributed, and operating means connected to said distributer and adjustable to vary the intervals of said deposits, of a checking device mounted to rotate with the operating means and adapted to mark the position of the articles deposited.

22. In a planter, the combination with a revoluble carrier having devices thereon capable of receiving the articles to be planted, of a feeder capable of supplying the articles to the carrier in a single row.

23. In a planter, the combination with a revoluble carrier having devices thereon capable of receiving the articles to be planted, of a feeding device for supplying the articles to the receiving devices of the carrier capable of being adjusted to permit only one article to be opposite to the carrier at a time.

24. A checking device for planters, comprising a rotatable support adapted to be operated in conjunction with the mechanism of the planter, having a plurality of sockets arranged in combinations thereon to enable different numbers of markers to be secured equidistantly thereon, a plurality of markers yieldingly supported on arms extending into said sockets and means for securing said arms therein.

25. A checking device for planters, comprising a rotatable disk having a plurality of sets of sockets arranged thereon, and a plurality of markers movably supported by arms extending into said sockets, springs interposed between said markers and arms and yieldingly retaining said markers in an extended position in relation to said arms, and means for securing said arms in said sockets, said arms extending radially around said disk at equidistant intervals, the distance of which may be varied.

26. In a planter, the combination with a movable distributer having devices for receiving the articles to be planted, of a conveyer for feeding the articles to the distributer in a direction transversely to the plane of motion of the distributer.

27. In a planter, the combination with a revoluble distributer having impaling devices thereon capable of being operated to receive the articles to be planted, of a conveyer for feeding the articles to the distributer in a direction transversely of the plane of rotation of the latter, and a guide or abutment arranged opposite to the distributer for holding the articles successively in operative position to be impaled by the devices of the distributer.

28. In a planter, the combination with a revoluble distributer having impaling devices thereon, and means for feeding the articles to be planted to the distributer, of a relatively fixed receptacle located at one side of the distributer and having an ejector formed thereon to remove the articles from the impaling devices and deposit them in the receptacle.

29. In a planter, the combination with a distributer having devices thereon capable of receiving and discharging the articles to be planted, and actuating means for intermittently operating the distributer, of a movable endless conveyer movable continuously in one direction for feeding the articles to the distributer in a row.

30. In a planter, the combination with a distributer capable of rotary motion and having devices thereon formed to receive and discharge the articles to be planted, an actuating device for intermittently operating the distributer, and a device for preventing retrograde motion of the distributer, of a conveyer for supplying the articles to the distributer in a row.

31. In a planter, the combination with a revoluble distributer having devices thereon capable of receiving and discharging the articles to be planted, and a conveyer arranged to feed the articles to the distributer in a row, of a device for actuating the distributer to receive an article from the conveyer and move it out of the path of the remaining articles, the succeeding actuation of the distributer serving to discharge the article therefrom.

NICHOLAS WARING.

Witnesses:
G. WILLARD RICH,
CLARENCE A. BATEMAN.